United States Patent [19]

Kasuga et al.

[11] 4,197,514

[45] Apr. 8, 1980

[54] MICROWAVE DELAY EQUALIZER COMPRISING A PAIR OF DISTRIBUTED-CONSTANT ELEMENTS AS A DIRECTIONAL COUPLER

[75] Inventors: Osamu Kasuga; Osamu Yamamoto, both of Tokyo, Japan

[73] Assignee: Nippon Electric Co., Ltd., Tokyo, Japan

[21] Appl. No.: 834,923

[22] Filed: Sep. 20, 1977

[30] Foreign Application Priority Data

Sep. 21, 1976 [JP] Japan .................................. 51-113481

[51] Int. Cl.² .............................................. H01P 7/14
[52] U.S. Cl. .................................. 333/28 R; 333/109;
333/227
[58] Field of Search ................................ 333/10, 28 R

[56] References Cited

U.S. PATENT DOCUMENTS 3,277,403 10/1966 Cohn ................................... 333/28 R
3,363,201 1/1968 Isaacson .................................... 333/10

Primary Examiner—Paul L. Gensler
Attorney, Agent, or Firm—Sughrue, Rothwell, Mion, Zinn and Macpeak

[57] ABSTRACT

In a microwave delay equalizer for an input signal of a microwave frequency having an inevitable delay distortion, a directional coupler and a pair of resonators are placed, respectively, on a center area of a conductive base member and on those side areas thereof which lie on both sides of the center area. The coupler comprises a pair of distributed-constant elements electromagnetically coupled to each other either with an air space or a dielectric plate interposed therebetween and to the respective resonators to derive from the input signal supplied to one of the elements a delay equalized output signal in the other element. Each element has a length equal to an odd multiple of a quarter wavelength of the signal travelling therealong. Each resonator consists of at least one resonance piece. For a dielectric base member, the elements possessed preferably of corrugated sides opposing each other with a zigzag-shaped area of the center area left therebetween and the resonance pieces are formed directly on the center and side areas by conductive patterns together with a pair of conductors which are connected to one end each of the resonance pieces and are to be grounded.

9 Claims, 9 Drawing Figures

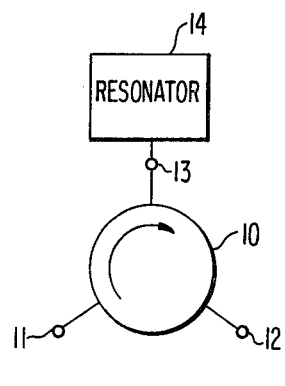
FIG 1
PRIOR ART
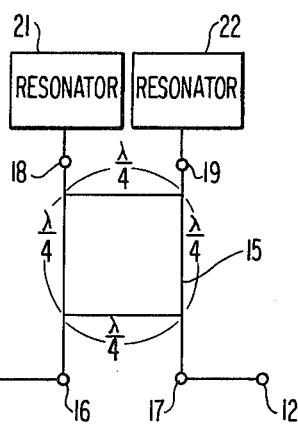
FIG 2
PRIOR ART
FIG 3
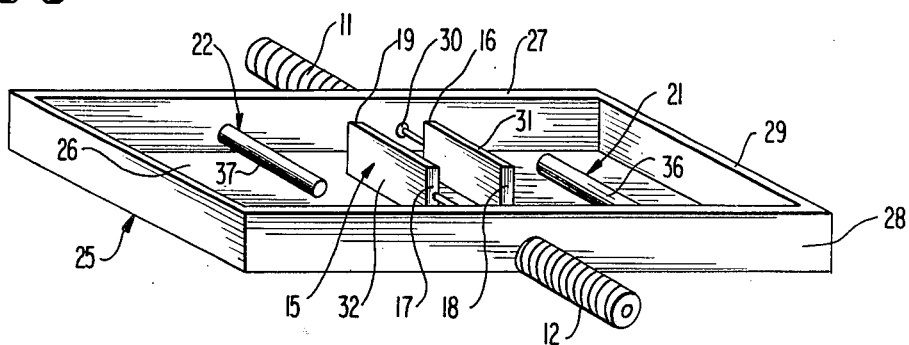
FIG 4
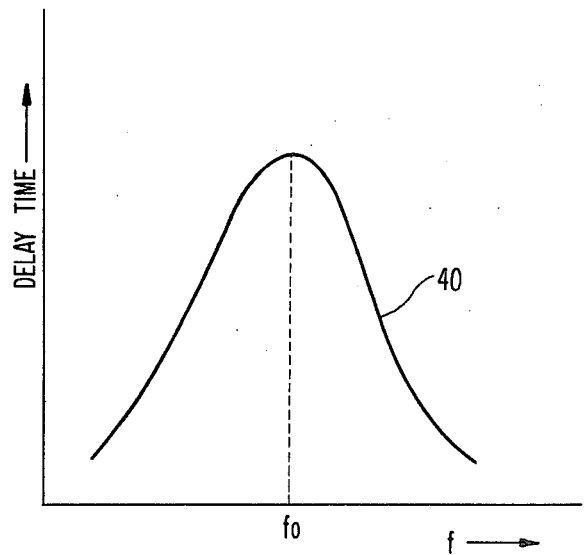

MICROWAVE DELAY EQUALIZER COMPRISING A PAIR OF DISTRIBUTED-CONSTANT ELEMENTS AS A DIRECTIONAL COUPLER

BACKGROUND OF THE INVENTION

This invention relates to a microwave delay equalizer for use in a microwave communication system.

In a microwave communication system and, more particularly, a microwave multiplex frequency modulation communication system, a delay distortion inevitably occurs due to an unequal or nonlinear time delay at a transmitter and/or a receiver of the system. Control of the delay distortion becomes more important because the delay distortion is liable to increase with transmission capacity of the microwave communication system. The delay distortion is usually compensated by the use of a microwave delay equalizer for rendering the time delay equal or flat as a whole. Inasmuch as the time delay is represented by the derivative of a phase shift with respect to frequency, the delay equalizer compriser one or more reactance elements for making the phase shift versus frequency characteristic linear over a given bandwidth.

As will later be described with reference to one of several figures of the accompanying drawing, a conventional microwave delay equalizer of the type described comprises a circular having three ports with a resonator connected to one of the three ports as the reactance element. However, the circulator is usually made of ferrite, the characteristics of which are considerably dependent on temperature. Accordingly, temperature compensation is indispensable. An alternative conventional delay equalizer comprises a hybrid directional coupler having a pair of additional ports besides an input and an output port. A pair of resonant cavities are connected to the respective additional ports as the reactance elements, as will later be described with reference to another figure of the accompanying drawing. The alternative conventional equalizer is bulky and heavy due to the two resonant cavities.

SUMMARY OF THE INVENTION

It is therefore an object of this invention to provide a microwave delay equalizer which is small in size and is not heavy.

It is another object of this invention to provide a microwave delay equalizer of the type described, which is simple in structure and yet exhibits an excellent temperature characteristic.

It is yet another object of this invention to provide a microwave delay equalizer of the type described, which comprises no bulky resonant cavities.

A microwave delay equalizer to which this invention is applicable is for equalizing a delay distortion inevitable in an input signal of a microwave frequency band including a predetermined frequency to produce an output signal of the frequency band. The output signal is substantially exempted from the delay distortion. The equalizer includes an input and an output terminal for the input and output signals, respectively, a directional coupler having a first, a second, a third, and a fourth port, and a first and a second resonator coupled in the band to the directional coupler. The input and output terminals are substantially parallel to a predetermined direction having a first and a second sense and are connected to the first and second ports, respectively. The coupler is capable of providing directional coupling in the band to make the input signal supplied thereto from the input terminal appear as the output signal supplied therefrom to the output terminal and appear as a pair of phase-shifted signals at the third and fourth ports, respectively. The coupled signal pair have a phase difference relative to each other. The first and second resonators are resonant substantially to the predetermined frequency. According to this invention, the microwave delay equalizer comprises a conductor to be grounded and a base member having a principal surface having, in turn, a center area and a pair of side areas contiguous transversely of the direction to the center area on both sides thereof. The first and second ports are offset on the center area relative to each other. The directional coupler comprises a first and a second distributed-constant element extended substantially along the direction from the first port in the first sense to the third port and from the second port in the second sense to the fourth port, respectively, and electromagnetically coupled to each other. Each of the first and second distributed-constant elements has a length substantially equal to an odd integral multiple of a quarter wavelength in each element of a signal of the frequency. The third and fourth ports of the distributed-constant elements are not connected to the conductor. The first and second resonators are connected to the conductor on the side areas, respectively, and electromagnetically coupled to the first and second distributed-constant elements, respectively.

BRIEF DESCRIPTION OF THE DRAWING

FIG. 1 is a block diagram of a conventional microwave delay equalizer;

FIG. 2 shows partly in blocks another conventional microwave delay equalizer;

FIG. 3 is a perspective view of a microwave delay equalizer according to a first embodiment of this invention;

FIG. 4 shows a delay time versus frequency characteristic of a microwave delay equalizer according to the first embodiment of this invention;

DESCRIPTION OF THE PREFERRED EMBODIMENTS

Figure 5:
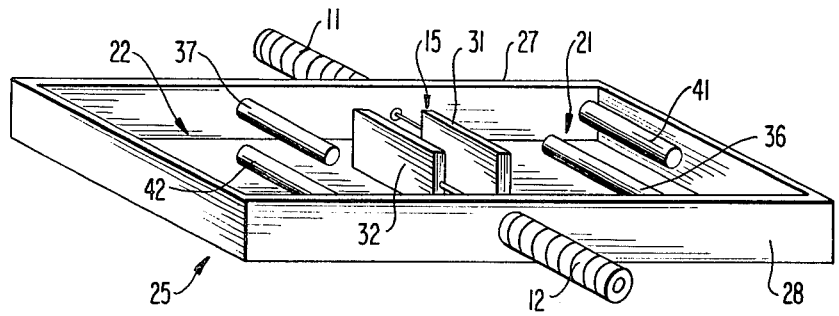
FIG. 5 is a perspective view of a microwave delay equalizer according to a second embodiment of this invention.

Referring to FIG. 1, description will be made of a conventional microwave delay equalizer for a better understanding of this invention. The conventional delay equalizer comprises a circulator 10 having three ports connected to an input terminal 11, an output one 12, and an additional terminal 13. A single resonator 14 is coupled to the additional terminal 13. The input terminal 11 is supplied with a microwave input signal of a given frequency band from a conventional band pass filter (not shown). The input signal is subject to a small time delay at a center frequency of the band. The input signal is impressed from the input terminal 11 to the resonator 14 through the additional terminal 13 and thereafter reflected back to the same terminal 13 by the reflecting action of the resonator 14. The reflected signal is circulated into the output terminal 12 as an output signal with the delay distortion of the input signal equalized. The resonator 14 has a resonance frequency substantially equal to the center frequency. Accordingly, the input signal is subjected to a large time delay at the resonance frequency as a result of resonance at the resonator 14. This equalizes the time delay of the input signal. The conventional equalizer is, however, considerably temperature dependent as described in the preamble of the instant specification.

Referring to FIG. 2, another conventional microwave delay equalizer comprises input and output terminals 11 and 12 and a three-decibel quadrature directional coupler 15 having first and second ports 16 and 17 connected to the terminals 11 and 12, respectively. The connections between the input terminal 11 and the first port 16 and between the output terminal 12 and the second port 17 are extended substantially along a predetermined direction. The coupler 15 further has third and fourth ports 18 and 19. As in the equalizer illustrated with reference to FIG. 1, the input terminal 11 is for an input signal of a microwave band including a predetermined frequency. The input signal is subject to delay distortion. The directional coupler 15 has four conductors between four port pairs 16 and 17, 16 and 18, 18 and 19, and 17 and 19. Each conductor has a length equal to one quarter wavelength of a signal of the predetermined frequency which travels therealong. The input signal supplied to the first port 16 is therefore supplied to the third and fourth ports 18 and 19 as a pair of phase-shifted signals. The signal pair has a quadrature phase difference relative to each other. The third and fourth ports 18 and 19 are coupled to resonators 21 and 22 having a resonance frequency substantially equal to the predetermined frequency and a substantially identical reflective impedance. The resonators 21 and 22 supply the output terminal 12 with an output signal exempted from the delay distortion without any reflection of the signal back to the input terminal 11. The equalizer is bulky as already described because two resonant cavities are usually used as the resonators 21 and 22.

Referring now to FIG. 3, a microwave delay equalizer according to a first embodiment of this invention comprises, as is the case with the conventional microwave delay equalizer illustrated with reference to FIG. 2, input and output terminals 11 and 12 for an input and an output signal of the type described, a directional coupler 15 having first, second, third, and fourth ports 16, 17, 18, and 19, and first and second resonators 21 and 22. The equalizer comprises a base member 25, which is conductive in the illustrated example, so as to serve as a conductor to be grounded. The illustrated base member 25 is rectangular in shape. The base member 25 has a principal surface 26 and comprises a pair of spaced side or rear and front wall members 27 and 28 substantially perpendicular to the principal surface 26 and another pair of similar side or right and left wall members, both designated by a single numeral 29. The input and output terminals 11 and 12 are substantially parallel to a predetermined direction which is parallel, in turn, in the illustration to the right and left wall members 29 and has a first sense directed from the rear wall member 27 to the front wall member 28 and a second sense opposite to the first sense. It will be understood that the rear and front wall members 27 and 28 lie transversely of the predetermined direction. For convenience of further description, the principal surface 26 is divided into a center area extending between the rear and front wall members 27 and 28 and a pair of side areas extending also between the wall members 27 and 28 and between the center area and the right and left wall members 29, respectively. The first and the second ports 16 and 17 are offset on the center area relative to each other. The input and output terminals 11 and 12 are supported by the rear and the front wall members 27 and 28 and are connected to the first and second ports 16 and 17 through a pair of insulator pieces, one of which is depicted at 30.

Further referring to FIG. 3, the directional coupler 15 comprises first and second distributed-constant elements 31 and 32 supported on the center area between the rear and front wall members 27 and 28 with an air space left therebetween. The first and second distributed-constant members 31 and 32 are extended substantially along the direction from the first port 16 in the first sense to the third port 18 and from the second port 17 in the second sense to the fourth port 19, respectively. Each of the distributed-constant elements 31 and 32 is insulated from the base members 25 and has a length substantially equal to an odd integral multiple of a quarter wavelength of a signal of the predetermined frequency that travels therealong. It is obvious that the distributed-constant elements 31 and 32 serve as a directional coupler 15 due to the electromagnetical coupling provided therebetween through the air space and that the phase-shifted signals mentioned above appear at the third and fourth ports 18 and 19 (reference being requested, if desired, to IEEE Transactions, Vol. MTT-14, No. 7 (July, 1966), pp. 337-346). The first and second resonators 21 and 22 are provided, as shown, by first and second resonance pieces 36 and 37 extended over the respective side areas from the rear and front wall members 27 and 28 substantially parallel to the direction in the second and first senses, respectively, and electromagnetically coupled to the first and second distributed-constant elements 31 and 32, respectively. Each of the resonance pieces 36 and 37 has a length substantially equal to a quarter wavelength of a signal of the predetermined frequency which travels therealong and is resonant to the predetermined frequency. In practical use, a conductor cover (not shown) is put on the wall members 27 through 29.

In operation, the input signal is supplied from the input terminal 11 to the first distributed-constant element 31 through the first port 16 to derive the output signal delivered from the second distributed-constant element 32 to the output terminal 12 through the second port 17. The phase-shifted signals have a quadrature phase difference relative to each other. More particularly, the phase-shifted signal of the fourth port 19 delays by 90 degrees as compared with that of the third port 18. The first and second resonators 21 and 22 give the input signal a large time delay at the predetermined frequency. The small time delay inevitable in the input signal at the predetermined frequency is thus compensated by means of the directional coupler 15 and the resonator pair 21 and 22. Accordingly, the output terminal 12 is supplied with the output signal exempted from the delay distortion.

Turning to FIG. 4, wherein the abscissa and the ordinate are representative of frequency f and a delay time, a curve 40 shows the large time delay set forth hereinabove. The curve 40 is substantially symmetric with regard to a center frequency $f_0$ of the microwave frequency band, exhibiting a peak delay time at the center frequency $f_0$. Like the conventional delay equalizer shown in FIG. 2, the resonators 21 and 22 have high unloaded Q values. Accordingly, a delay equalizer according to the first embodiment is capable of equalizing the nonlinear time delay of the input signal with amplified characteristics thereof substantially unchanged.

Referring to FIG. 5, a delay equalizer according to a second embodiment of this invention comprises similar parts designated by like reference numerals as in FIG. 3 except that each of the first and second resonators 21 and 22 further comprises an additional resonance piece 41 or 42 having a length substantially equal to a quarter wavelength of a signal of the predetermined frequency that travels therealong. The additional resonance pieces 41 and 42 of the first and second resonators 21 and 22 are extended from the rear and front wall members 27 and 28 substantially along the direction in the first and second senses, respectively. In other words, the additional resonance pieces 41 and 42 are extended in opposite senses relative to the resonance pieces 36 and 37, respectively, and serve to improve higher order delay distortions. As depicted, the additional resonance pieces 41 and 42 are located laterally outwardly of the resonance pieces 36 and 37, respectively.

Figure 6:
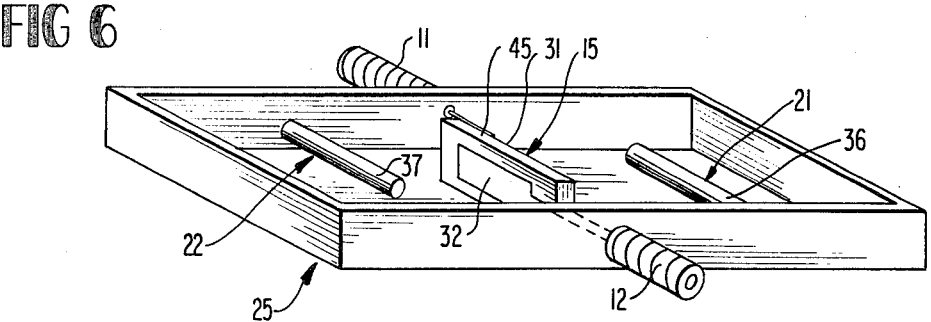
FIG. 6 is a perspective view of a microwave delay equalizer according to a third embodiment of this invention.

Referring to FIG. 6, a microwave delay equalizer according to a third embodiment of this invention again comprises similar parts designated by like reference numerals as in FIG. 3 except that the directional coupler 15 comprises a dielectric plate 45 between the distributed-constant elements 31 and 32. In the illustrated example, the distributed-constant elements 31 and 32 are attached to the dielectric plate 45 and are capable of being provided by conductive patterns formed on a pair of principal surfaces of the plate 45. As in the delay equalizer shown in FIG. 5, each of the resonators 21 and 22 may further comprise another resonance piece.

Figure 7:
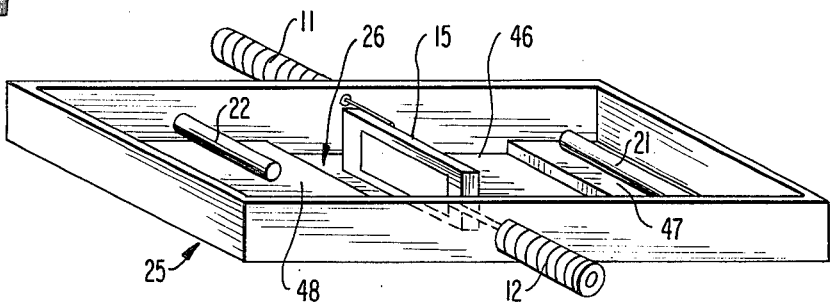
FIG. 7 is a perspective view of a microwave delay equalizer according to a fourth embodiment of this invention.

Referring to FIG. 7, a microwave delay equalizer according to a fourth embodiment of this invention is similar to the equalizer illustrated with reference to FIG. 6. The center area, herein designated by a numeral 46, of the principal surface 26 of the conductive base member 25 is recessed relative to both side areas 47 and 48 away from the directional coupler 15. In other words, the side areas 47 and 48 are protruded towards the first and second resonators 21 and 22, respectively. By this arrangement, it is possible to control the electromagnetic coupling between the first and second distributed-constant elements 31 and 32 and the first and second resonators 21 and 22. As the case may be, the center area 46 is protruded towards the directional coupler 15 relative to the side areas 47 and 48 to achieve optimum electromagnetic coupling.

Figure 8:
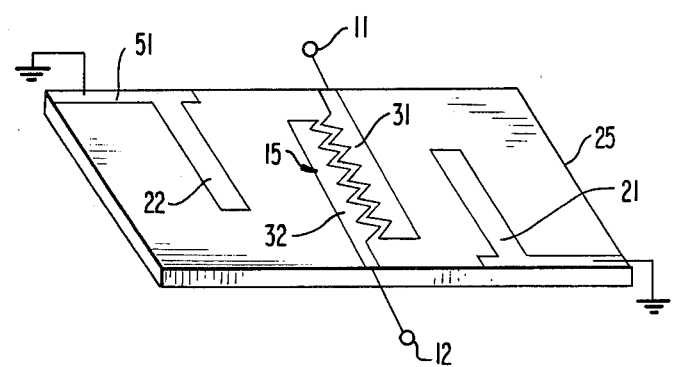
FIG. 8 is a perspective view of a microwave delay equalizer according to a fifth embodiment of this invention.

Referring to FIG. 8, a microwave delay equalizer according to a fifth embodiment of this invention comprises similar parts again designated by like reference numerals. In the illustrated example, the base member 25 is a substantially rectangular dielectric substrate having a pair of spaced side or rear and front lines. The first and second distributed-constant elements 31 and 32 are extended directly on the center area of the dielectric substrate 25 from the side lines substantially along the direction in the first and the second senses, respectively. The input and output terminals 11 and 12 are connected to the distributed-constant elements 31 and 32 at the rear and front lines. A conductor 51 is extended partly along each of the rear and front lines. The resonance pieces of the first and second resonators 21 and 22 are extended directly on the respective side areas of the dielectric substrate 25 from the conductors 51 substantially along the direction in the second and first senses, respectively. Preferably, the distributed-constant elements 31 and 32 have corrugated sides opposing each other with a zig-zag-shaped area of the dielectric substrate center area interposed therebetween. It is possible to manufacture the directional coupler 15 and the resonators 21 and 22 by a conductor pattern formed on the substrate. The resonance pieces and the additional resonance pieces, if used, may be provided by dielectric resonator known in the art.

Figure 9:
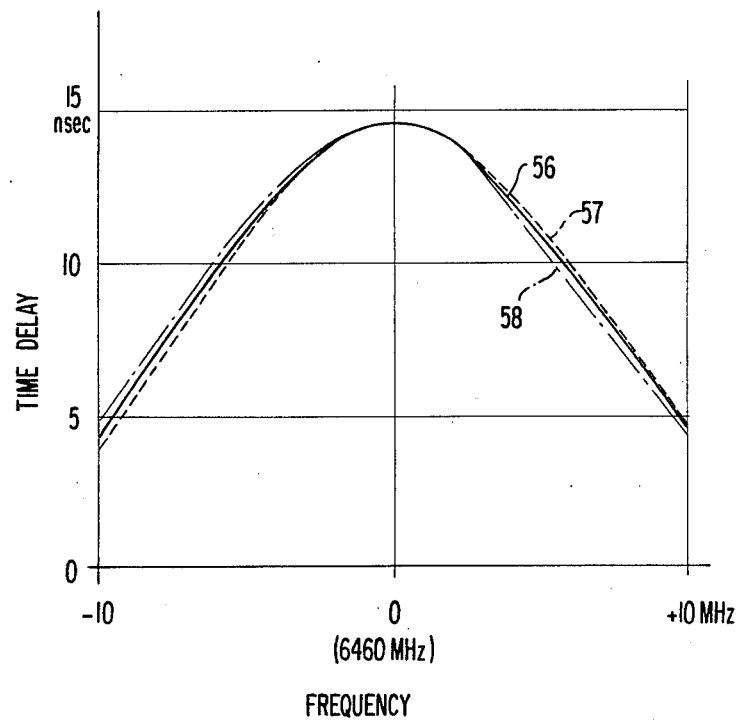
FIG. 9 is a graphical representation for illustrating temperature dependency of a microwave delay equalizer according to this invention.

Finally referring to FIG. 9, wherein the abscissa and ordinate represent frequency and time delay as in FIG. 4, description will be made of temperature dependency of a delay equalizer according to this invention. By way of example, measurements were made by using an equalizer exemplified in FIG. 6 and comprising the distributed-constant elements 31 and 32, each 3.2 millimeters wide and 12 millimeters long, and the resonance pieces 36 and 37, each 6 millimeters long and 5 millimeters in diameter. Use was made of a frequency band having a center frequency of 6460 MHz. A solid line curve 56 is representative of a delay time characteristic at 25° C. A dashed line curve 57 and a dash-dot line curve 58 represent the characteristics at 0° C. and 50° C., respectively. The delay equalized had a delay time of about 15 nanoseconds at the center frequency. As is apparent from the curves 56 through 58, the delay time versus frequency characteristics are scarcely dependent on temperatures.

While this invention has been so far described in conjunction with preferred embodiments, it is to be understood that various modifications and changes may be made without departing from the spirit and scope of this invention. For example, it is possible to use a base member 25 of a dielectric material in the embodiments illustrated with reference to FIGS. 3 and 5 through 7 or to dispose each resonance piece and the additional resonance pieces, if any, substantially perpendicular to the principal surface of the base member rather than parallel thereto as exemplified in these embodiments. The additional resonance pieces or elements of the first and second resonators may be extended in the same senses as the resonance pieces thereof, respectively.

What is claimed is:

1. A microwave delay equalizer for equalizing a delay distortion, inherent in an input signal of a microwave frequency band including a predetermined frequency, to produce an output signal of said frequency band, said output signal being substantially free of said delay distortion, said equalizer including an input and an output terminal for said input and output signals, respectively, a directional coupler having a first, a second, a third, and a fourth port, and a first and a second resonator coupled in said band to said directional coupler, said input and output terminals being substantially parallel to a predetermined direction having a first and a second sense and connected to said first and second ports, respectively, said coupler being capable of providing directional coupling in said band to make said input signal supplied thereto from said input terminal appear as said output signal supplied therefrom to said output terminal and appear as a pair of phase-shifted signals at said third and fourth ports, respectively, said phase-shifted pair having a phase difference relative to each other, said first and second resonators being resonant substantially to said frequency, wherein the improvement comprises:

a grounded conductive base member having a principal surface having, in turn, a center area and a pair of side areas contiguous with said center area and disposed on either side thereof in a direction transverse to said predetermined direction;

said first and second ports being disposed over said central area and offset with respect to one another along a direction transverse to said predetermined direction;

said directional coupler comprising a first and a second distributed-constant element extended substantially along said predetermined direction from said first port in said first sense to said third port and from said second port in said second sense to said fourth port, respectively; and electromagnetically coupled to each other, each of said first and second distributed-constant elements having a length substantially equal to an odd integral multiple of a quarter wavelength of a signal in said each element of said frequency, said third and fourth ports being unconnected;

said first and second resonators being disposed over respective ones of said side areas and connected to said conductive base member and electromagnetically coupled to said first and second distributed-constant elements, respectively.

2. A microwave delay equalizer as claimed in claim 1, wherein said first and second distributed-constant elements oppose each other with an air space left therebetween, said base member further comprises a pair of spaced side wall members substantially perpendicular to said principal surface and transverse to said predetermined direction, said input and output terminals being supported by said side wall members, respectively, said distributed-constant elements being placed between said side wall members.

3. A microwave delay equalizer as claimed in claim 2, wherein each of said first and second resonators comprises a resonance piece connected to each of said sidewall members and having a length substantially equal to a quarter wavelength in said piece of a signal of said frequency, the resonance pieces of said first and second resonators being extended from said side wall members substantially along said direction in said second and first senses, respectively, and electromagnetically coupled to said first and second distributed-constant elements, respectively.

4. A microwave delay equalizer as claimed in claim 3, wherein each of said first and second resonators further comprises, in addition to said resonance pieces, a resonance element connected to a respective sidewall member and having a length substantially equal to a quarter wavelength in said resonance element of a signal of said frequency, the resonance elements of said first and second resonators being extended from said side wall members substantially along said direction, and electromagnetically coupled to said resonance pieces of said first and second resonators, respectively.

5. A microwave delay equalizer as claimed in claim 1, wherein said directional coupler further comprises a dielectric plate between said first and second distributed-constant elements, said base member further comprising a pair of spaced side wall members substantially perpendicular to said principal surface and transverse to said predetermined direction, said input and output terminals being supported by said wall members, respectively, said distributed-constant elements and said dielectric plate being placed between said side wall members.

6. A microwave delay equalizer as claimed in claim 5, wherein said first and second distributed-constant elements are in direct contact with said dielectric plate.

7. A microwave delay equalizer as claimed in claim 6, wherein each of said first and second resonators comprises a resonance piece connected to a respective sidewall member and having a length substantially equal to a quarter wavelength in said piece of a signal of said frequency, the resonance pieces of said first and second resonators being extended from said side wall members substantially along said predetermined direction in said second and first senses, respectively, and electromagnetically coupled to said first and second distributed-constant elements, respectively.

8. A microwave delay equalizer as claimed in claim 7, wherein each of said first and second resonators further comprises, in addition to said resonance pieces, a resonance element connected to a respective sidewall member having a length substantially equal to a quarter wavelength in said resonance element of a signal of said frequency, the resonance elements of said first and second resonators being extended from said side wall members substantially along said predetermined direction and electromagnetically coupled to said resonance pieces of said first and second resonators, respectively.

9. A microwave delay equalizer as claimed in claim 1, wherein said center area is recessed relative to said side areas away from said distributed-constant elements.

* * * * *